United States Patent [19]

Barlow

[11] Patent Number: 5,340,353
[45] Date of Patent: Aug. 23, 1994

[54] APPARATUS FOR THE EXTRACTION OF MEAT FROM THE TAILS OF CRUSTACEA

[75] Inventor: Graham F. Barlow, Glasgow, Scotland

[73] Assignee: Offshell Trading Limited, Glasgow, Scotland

[21] Appl. No.: 50,138

[22] Filed: May 3, 1993

[30] Foreign Application Priority Data

Nov. 6, 1990 [GB] United Kingdom ............ 9024057.3

[51] Int. Cl.⁵ ................................................. A22C 29/02
[52] U.S. Cl. ............................................................ 452/9
[58] Field of Search ................................... 452/9, 1, 8

[56] References Cited

U.S. PATENT DOCUMENTS 2,987,759  6/1961  Lapeyre et al. ........................ 452/9
3,203,039  8/1965  Glidden et al. ........................ 452/9
3,274,640  9/1966  Rossnan .................................. 452/8
4,236,277 12/1980  Rudy et al. ............................. 452/9

*Primary Examiner*—Willis Little
*Attorney, Agent, or Firm*—Krass & Young

[57] ABSTRACT

The invention relates to apparatus for the extraction of meat from the tails of crustacea such as prawns. An example of the apparatus described comprises a frame (10) supporting a conveyor means (12) which carry support means in the form of releasable cartridges (26) towards pressure applying rollers (20, 22) between which the cartridges pass. The lower roller (22) is preferably hollow and apertured so that the meat from prawn tails secured to the cartridges is pressed out of the tail shells and passes through the roller (22) for collection.

9 Claims, 2 Drawing Sheets

APPARATUS FOR THE EXTRACTION OF MEAT FROM THE TAILS OF CRUSTACEA

The present invention relates to apparatus for the extraction of meat from the tails of crustacea.

A method of extracting meat from crustacea such as prawns using a high pressure water jet is known. The head of the prawn is removed and discarded as most of the meat is contained in the tail portion. By virtue of the shell forming the tail portion having a soft underside, the tail portion tends to curl inwardly. The operator inserts into the open end of the tail portion a high pressure water jet which blows the meat from the shell case. This method has a disadvantage in that it can only be used on defrosted and raw (i.e. not pre-cooked) tail portions. Additionally, it is relatively slow and the size and shape of the tail portions makes handling them difficult.

It is an object of the present invention to provide new and improved meat extracting apparatus which obviates the aforementioned disadvantages.

According to the present invention there is provided apparatus for extracting meat from tail portions of crustacea, comprising an apertured support element for supporting a plurality of tail portions in an extended condition in which the meat can be extracted therefrom, rotary pressure-applying means adapted to contact a plurality of tail portions supported on said support means, said rotary pressure-applying means including a roller adapted to contact an underside of said support means as the latter is presented to the rotary pressure applying means, said support means being provided with attachments to maintain the tail portions in an orientation aligned with the direction of the presentation of the support means and with the tail portions rearward end first in said extended condition, said roller being provided with orifices adapted to co-incide with apertures of said support means when in contact therewith, relative movement between said pressure applying means and said support means causing meat to be extracted from the tail portions.

Advantageously, the roller device comprises at least two rollers operating to form a nip adapted to receive the tail portions rearward end first. Conveniently the lower of the rollers may be apertured and hollow.

Preferably, the support element is in the form of a releasable unit or cartridge which can be loaded with a plurality of tail portions prior to being releasably secured to the apparatus for treatment by the pressure means.

Conveniently, the support element is provided with an aperture adjacent each attachment means and through which extracted meat can pass for collection.

Conveniently, said attachment means for each tail portion comprises a spike on the support element for engaging the tail portion at its front, open, end and a clip for engaging the rearward end of the tail portion so as to retain the tail portion in an extended condition. An embodiment of the present invention will now be described, by way of example, with reference to the accompanying drawings, in which.

Figure 1:
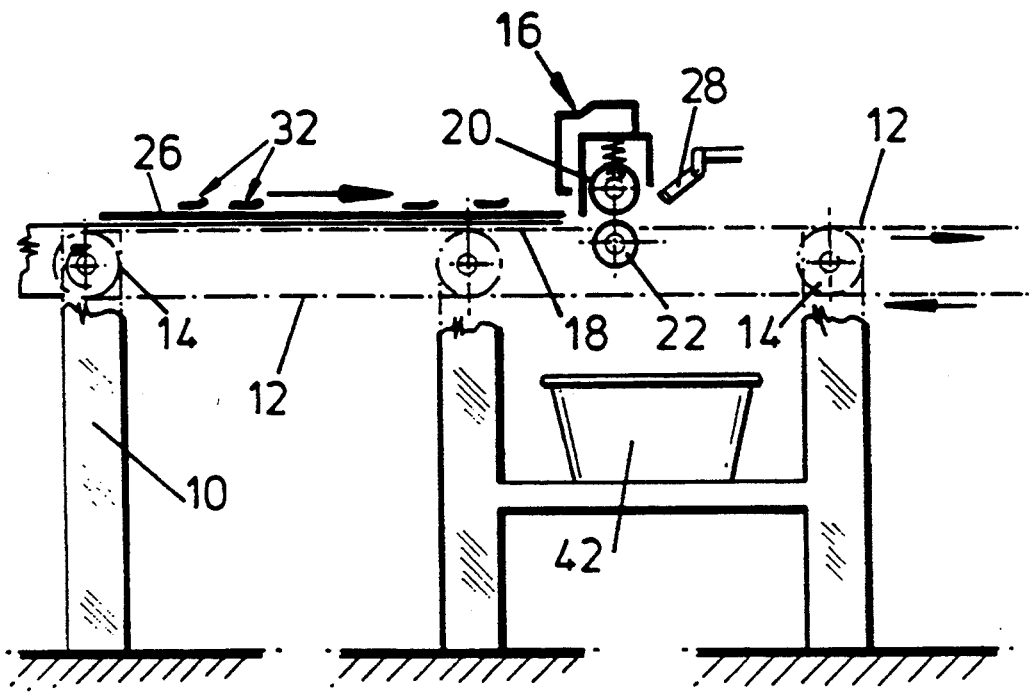
FIG. 1 is a diagrammatic side view of apparatus for extruding meat from crustacea such as prawns or squat-lobsters.
Figure 2:
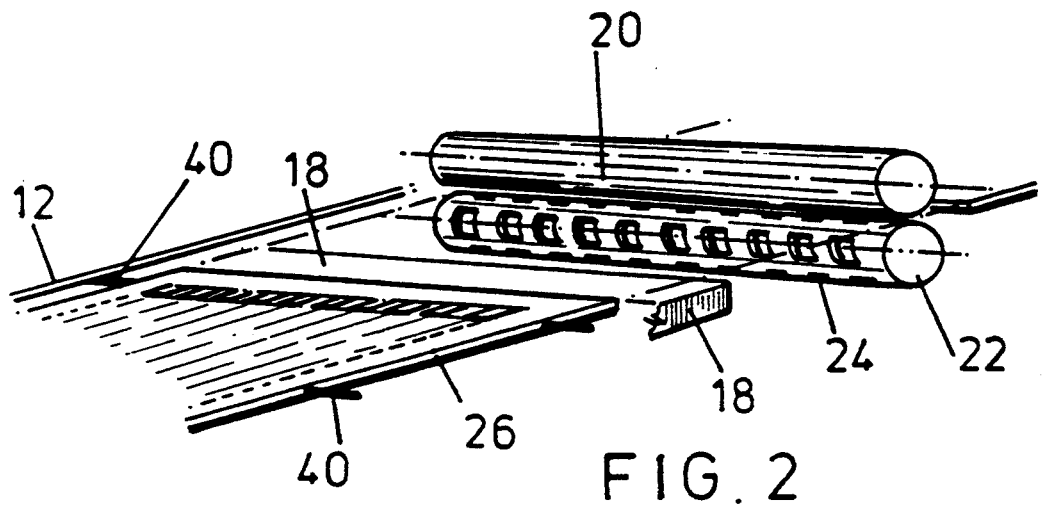
FIG. 2 is a diagrammatic perspective view of the apparatus of FIG. 1.

Referring to the drawings, apparatus for removing the meat from tails of crustacea such as prawns (*nephrops norvegicus*) or squat-lobsters (*munida rugosa*) (hereinafter referred to generically as "lobster tails") comprises a frame 10 which supports two endless conveyor chains 12 adapted to travel over sprockets 14 by means of a drive supplied by an electric motor 16.

The conveyor belts 12 are arranged to travel one at each side of a planar table top 18. Lobster tail extruding means are provided which comprise a transversely extending hard rubber roller 20 positioned approximately 5 cm beyond the transverse end surface of the table rod 18.

A second roller 22 is provided immediately below the roller 20 and spaced slightly therefrom. The roller 22 comprises a hollow tube, the walls of which are provided with apertures 24, the purpose of which will be explained below.

Attached at each side thereof to the conveyor chain 12 so as to advance along the table top 18, is a cartridge 26 which acts as a support element for a plurality of lobster tails 28. The cartridge 26 is provided with a plurality of rows of apertures 30 which correspond in dimensions and transverse spacing with the apertures 24 of the roller 22.

Figure 3:
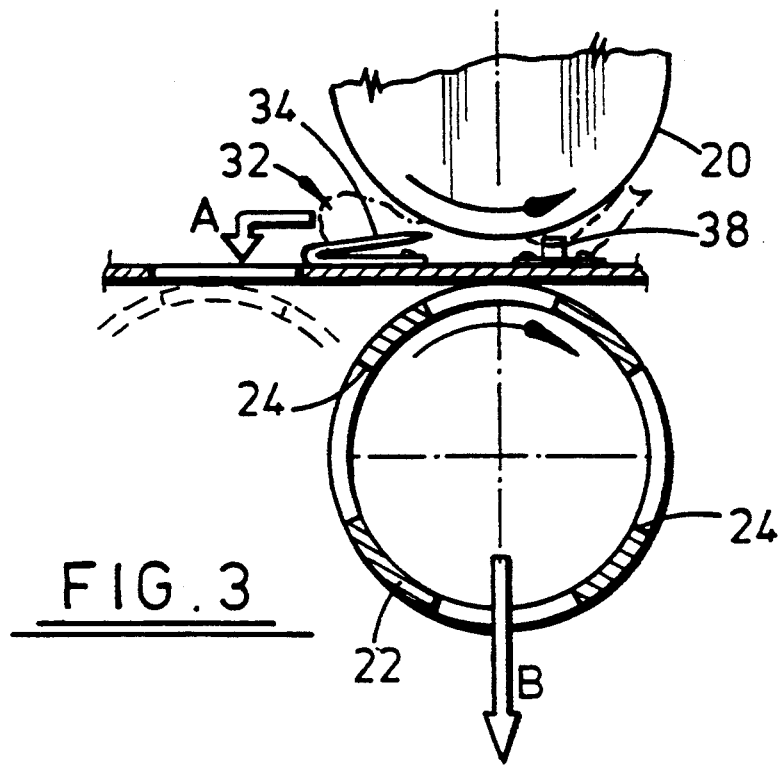
FIG. 3 is a fragmentary side view of the operation zone of the apparatus.
Figure 4:
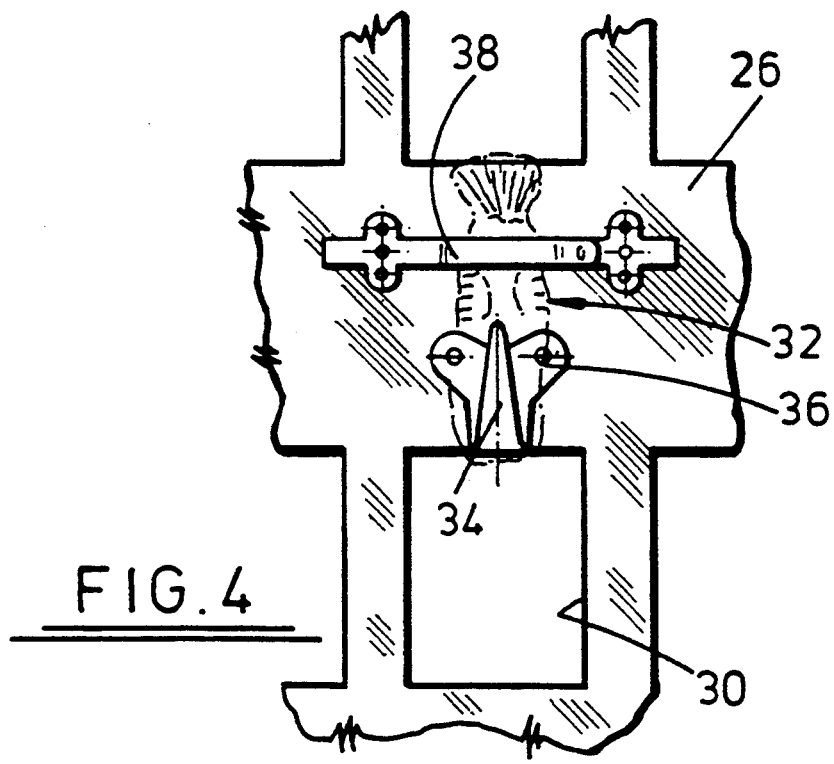
FIG. 4 is a detailed view of an attachment means for securing crustacea tails to the apparatus.

Lobster tails 32 are secured to the cartridge 26 at regions between each row of apertures 30 so that each tail is adjacent an associated apertures. It will be appreciated that in this way each row of apertures 30 in the cartridge 26 can be brought into register with the apertures 24 of the roller 22. Each aperture 30 in the cartridge is provided with a lobster tail attachment means consisting, as shown in FIGS. 3 and 4, of a spring stainless steel spike 34 arranged to be angled upwardly and forwardly in relation to the direction of movement of the conveyor belt between the roller 20 and 22. Each spike 34 is secured by rivets 36 to the cartridge in advance of its associated aperture 30. The attachment means also comprises a transversely extending stainless steel spring clip 38 similarly secured to the sheet in advance of its associated spike 36, the spring clip 38 being intended to engage the tail fins of a lobster tail.

In use of the apparatus, the cartridge, which may have in excess of 200 lobster tail receiving locations, is loaded with lobster tails by engaging the front open end of each lobster tail, from which the head has been removed, on to a spike 36 of the cartridge, the lobster tail being positioned on its back so that the shell is underneath so exposing the softer underportion off the lobster tail. The associated spring clip 38 is then engaged over the tail fins of the lobster tail so that the tail is maintained in an extended or unrolled condition. Once the cartridge 26 has been loaded with lobster tails, the cartridge is clipped to the conveyor chains 12 of the apparatus at 40 and the conveyor chains are energised in order to move the cartridge in a path between the nip formed by the rollers 20 and 22. As each lobster tail passes between the nip it is engaged by the transverse rubber roller 20 so as to extrude the meat from the shell, the meat being squeezed out of the open front end of the shell and allowed to fall downwardly (arrow A) through the associated aperture 30 in the cartridge 26 and the registering aperture 24 in the roller 22. The meat then falls through the roller 22 (arrow B) and into a collecting tray 42 beneath the rollers. During this step, in approximately 75% of the tails, the alimentary canal is held within the crushed shell case and does not pass into the separated meat. If desired, any build-up of meat in the apertures 24 of the roller 22 may be avoided by the use of a flat jet of water from at least one elongated nozzle 28 arranged adjacent the exit side of the rollers. This jet may be operated intermittently in synchronisation with the spaced positioning of rows of crustacea passing through the rollers and acts to clear meat which may otherwise form a build-up. On further movement of the conveyor belt, the empty shells are carried past the rollers on the cartridge. The cartridge can then be removed from the conveyor belt, the shells removed from the cartridge, and the cartridge cleaned and re-used. If required, the shells can be used, for example, for chicken feed.

It will be readily appreciated that modifications can be made to the embodiment of the invention as described above. For example, instead of the cartridge being the form of sheets of say one meter square, the cartridge can consist of an elongated roll or belt of rubber or plastics material in which the length is considerably greater than its width. In this instance, the used cartridge when it passes the treatment station can be wound on a receiving roller.

The stainless steel spring clip for engaging the lobster tail fins may be replaced by other forms of securement such as an elastic rubber band.

In the embodiment described above, the lobster tails are moved past the rollers. In an alternative arrangement the lobster tails may, if preferred, be mounted on a stationary structure and the press roller can be arranged to move relatively thereto. This type of arrangement is particularly suitable for use in circumstances where smaller numbers of lobster tails or prawns require to be treated, e.g. in fishmonger's shops or domestically.

By use of apparatus according to the present invention, meat can be extracted from shell fish such as squat-lobsters or prawns in a manner which maintains the natural shape and texture of the meat and without the shell being present in the collected meat.

It has been found that, by using the apparatus of the present invention, significantly higher rates of through-put can be achieved as compared with previously proposed apparatus. Furthermore, compared with prior processes, one refrigeration period can be eliminated and the method may be used satisfactorily on pre-cooked tail portions.

I claim:

1. Apparatus for extracting meat from tail portions of crustacea, comprising an apertured support element for supporting a plurality of tail portions in an extended condition in which the meat can be extracted therefrom, rotary pressure-applying means adapted to contact a plurality of tail portions supported on said support means, said rotary pressure-applying means including a roller adapted to contact an underside of said support means as the latter is presented to the rotary pressure applying means, said support means being provided with attachments to maintain the tail portions in an orientation aligned with the direction of the presentation of the support means and with the tail portions rearward end first in said extended condition, said roller being provided with orifices adapted to co-incide with apertures of said support means when in contact therewith, relative movement between said pressure applying means and said support means causing meat to be extracted from the tail portions.

2. Apparatus as claimed in claim 1 wherein the pressure-applying means comprises a further roller co-operating with said first mentioned roller to form a nip adapted to receive said tail portions rearward end first.

3. Apparatus as claimed in claim 2, wherein the rollers are arranged one above the other, said first mentioned, lower, roller being hollow, said orifices provided communication to the interior of the roller.

4. Apparatus as claimed in claim 1, wherein the support element is in the form of a cartridge or loadable unit adapted to be located with a plurality of tail portions and releasably secured, in a loaded condition, to the apparatus for presentation to the pressure-applying means.

5. Apparatus as claimed in claim 1, wherein the apertures of said support element are provided adjacent an associated one of said attachment means.

6. Apparatus as claimed in claim 1, wherein a plurality of support elements are adapted to be mounted upon conveyor means for travel towards and past the pressure-applying means.

7. Apparatus as claimed in claim 1, wherein the attachment means for each tail portion comprises a spike on the support element for engaging the tail portion at its front, open, end and a clip for engaging the rearward end of the tail portion so as to retain the tail portion in an extended condition.

8. Apparatus as claimed in claim 3, wherein there is further provided water jet producing means adapted to clear the apertures of entrained residual particles of meat removed by the pressure-applying roller device.

9. Apparatus as claimed in claim 8, wherein said jet producing means comprises at least one elongated nozzle.

* * * * *